(12) United States Patent
Yu et al.

(10) Patent No.: US 10,895,660 B2
(45) Date of Patent: *Jan. 19, 2021

(54) VEHICLE-MOUNTED TYPE BACK SCATTERING INSPECTION SYSTEM

(71) Applicants: NUCTECH COMPANY LIMITED, Beijing (CN); TSINGHUA UNIVERSITY, Beijing (CN)

(72) Inventors: Hao Yu, Beijing (CN); Ying Li, Beijing (CN); Weizhen Wang, Beijing (CN); Quanwei Song, Beijing (CN); Dongyu Wang, Beijing (CN); Haojie Chi, Beijing (CN); Jianmin Li, Beijing (CN); Yulan Li, Beijing (CN); Chunguang Zong, Beijing (CN); Zhiqiang Chen, Beijing (CN); Yuanjing Li, Beijing (CN); Li Zhang, Beijing (CN)

(*) Notice: Subject to any disclaimer, the term of this patent is extended or adjusted under 35 U.S.C. 154(b) by 14 days.

This patent is subject to a terminal disclaimer.

(21) Appl. No.: 16/234,630

(22) Filed: Dec. 28, 2018

(65) Prior Publication Data

US 2019/0204244 A1 Jul. 4, 2019

(30) Foreign Application Priority Data

Dec. 29, 2017 (CN) .......................... 2017 1 1466746

(51) Int. Cl.
*G01N 23/203* (2006.01)
*G01V 5/00* (2006.01)

(52) U.S. Cl.
CPC ......... *G01V 5/0025* (2013.01); *G01N 23/203* (2013.01); *G01V 5/0066* (2013.01)

(58) Field of Classification Search
CPC ............ G01N 23/20; G01N 23/20008; G01N 23/20066; G01N 23/20083; G01N 23/201;
(Continued)

(56) References Cited

U.S. PATENT DOCUMENTS

| 4,799,247 A | * | 1/1989 | Annis | .................. | G01V 5/0016 |
| | | | | | 378/57 |
| 4,839,913 A | * | 6/1989 | Annis | .................. | G01N 23/223 |
| | | | | | 378/146 |

(Continued)

FOREIGN PATENT DOCUMENTS

| CN | 103076350 A | 5/2013 |
| CN | 103529480 A | 1/2014 |

(Continued)

OTHER PUBLICATIONS

English translation of CN 103661126A by Patent Translate dated Mar. 21, 2020.*

(Continued)

*Primary Examiner* — Allen C. Ho
(74) *Attorney, Agent, or Firm* — Kilpatrick Townsend & Stockton, LLP

(57) ABSTRACT

The present disclosure discloses a vehicle-mounted type back scattering inspection system. The back scattering imaging device has a vehicle-mounted working state and a ground working state, and in the vehicle-mounted working state, the back scattering imaging device performs inspection work in a carriage; in the ground working state, the back scattering imaging device performs the inspection work on the ground at the outside of the carriage; and the back scattering imaging device is separately arranged relative to the carriage and is movable between the carriage and the (Continued)

ground to switch between the vehicle-mounted working state and the ground working state.

15 Claims, 5 Drawing Sheets

(58) Field of Classification Search
CPC .... G01N 23/203; G01N 23/22; G01V 5/0016; G01V 5/0025; G01V 5/0041; G01V 5/0066
USPC .......................................... 378/44–50, 86–90
See application file for complete search history.

(56) References Cited

U.S. PATENT DOCUMENTS

| | | | | |
|---|---|---|---|---|
| 5,022,062 A * | 6/1991 | Annis | ................. | G01N 23/203 378/57 |
| 5,029,194 A * | 7/1991 | Young | ................. | G01K 11/24 378/89 |
| 5,181,234 A * | 1/1993 | Smith | ................. | G01V 5/0025 250/472.1 |
| 5,224,144 A * | 6/1993 | Annis | ................. | G01N 23/04 378/146 |
| 5,253,283 A * | 10/1993 | Annis | ................. | G01N 23/04 378/46 |
| 5,260,982 A * | 11/1993 | Fujii | ................. | G01V 5/0025 378/57 |
| 5,493,596 A * | 2/1996 | Annis | ................. | G01N 23/10 378/146 |
| 5,764,683 A * | 6/1998 | Swift | ................. | G01N 23/04 378/57 |
| 5,821,862 A * | 10/1998 | MacKenzie | ................. | B64D 15/20 340/583 |
| 5,862,199 A * | 1/1999 | MacKenzie | ................. | B64D 15/20 378/89 |
| 5,940,468 A * | 8/1999 | Huang | ................. | G01N 23/04 378/57 |
| 6,094,472 A * | 7/2000 | Smith | ................. | G01N 23/203 378/86 |
| 6,151,381 A * | 11/2000 | Grodzins | ................. | G01N 23/04 378/57 |
| 6,192,104 B1 * | 2/2001 | Adams | ................. | G01N 23/203 378/149 |
| 6,249,567 B1 * | 6/2001 | Rothschild | ................. | G01N 23/20 378/63 |
| 6,252,929 B1 | 6/2001 | Swift et al. | | |
| 6,269,142 B1 * | 7/2001 | Smith | ............. | G01N 23/20083 378/160 |
| 6,278,115 B1 * | 8/2001 | Annis | ................. | G01V 5/0016 250/363.01 |
| 6,282,260 B1 * | 8/2001 | Grodzins | ................. | G01N 23/20 378/137 |
| 6,320,933 B1 * | 11/2001 | Grodzins | ................. | G01N 23/20 378/86 |
| 6,347,132 B1 * | 2/2002 | Annis | ................. | G01N 23/04 378/53 |
| 6,424,695 B1 | 6/2002 | Grodzins et al. | | |
| 6,421,418 B1 * | 7/2002 | Schulte | ................. | G01B 15/02 378/86 |
| 6,421,420 B1 * | 7/2002 | Grodzins | ................. | G01N 23/20 378/113 |
| 6,459,761 B1 * | 10/2002 | Grodzins | ................. | G01N 23/02 378/56 |
| 6,546,072 B1 * | 4/2003 | Chalmers | ................. | G01V 5/0016 378/57 |
| 6,658,087 B2 * | 12/2003 | Chalmers | ................. | G01V 5/0025 378/86 |
| 6,661,867 B2 * | 12/2003 | Mario | ................. | G01N 23/046 250/367 |
| 6,665,373 B1 * | 12/2003 | Kotowski | ................. | G01N 23/04 378/57 |
| 6,735,279 B1 * | 5/2004 | Jacobs | ................. | G01N 23/201 378/86 |
| 6,763,635 B1 * | 7/2004 | Lowman | ................. | B60P 1/5433 378/198 |
| 6,785,360 B1 * | 8/2004 | Annis | ................. | A61B 6/032 378/137 |
| 7,072,440 B2 * | 7/2006 | Mario | ................. | G01N 23/046 250/367 |
| 7,099,434 B2 * | 8/2006 | Adams | ................. | G01T 3/06 378/57 |
| 7,110,493 B1 * | 9/2006 | Kotowski | ................. | G01V 5/0025 378/57 |
| 7,130,374 B1 * | 10/2006 | Jacobs | ................. | G01N 23/203 378/76 |
| 7,400,701 B1 * | 7/2008 | Cason | ................. | G01V 5/0025 378/57 |
| 7,505,562 B2 * | 3/2009 | Dinca | ................. | G01N 23/201 378/57 |
| 7,551,715 B2 * | 6/2009 | Rothschild | ................. | G01N 23/04 378/198 |
| 7,561,666 B2 * | 7/2009 | Annis | ................. | G01T 1/163 378/87 |
| 7,620,150 B1 * | 11/2009 | Annis | ................. | A61B 6/483 378/87 |
| 7,623,614 B2 * | 11/2009 | Shefsky | ................. | G01N 23/02 378/2 |
| 7,627,088 B2 * | 12/2009 | Matoba | ................. | H01J 35/08 378/140 |
| 8,325,871 B2 * | 12/2012 | Grodzins | ................. | G01V 5/0025 376/153 |
| 8,439,565 B2 * | 5/2013 | Mastronardi | ........ | G01V 5/0016 378/205 |
| 8,483,356 B2 * | 7/2013 | Bendahan | ................. | G01N 23/203 378/57 |
| 8,582,720 B2 * | 11/2013 | Morton | ................. | G01V 5/0008 378/87 |
| 8,731,137 B2 * | 5/2014 | Arroyo, Jr. | ................. | G01V 3/08 378/57 |
| 8,761,338 B2 * | 6/2014 | Safai | ................. | G01N 23/203 378/86 |
| 8,824,632 B2 * | 9/2014 | Mastronardi | ........ | G01V 5/0058 378/90 |
| 8,855,268 B1 * | 10/2014 | Safai | ................. | G01N 23/203 378/87 |
| 8,879,688 B2 * | 11/2014 | Safai | ................. | G01N 23/203 378/87 |
| 8,903,045 B2 * | 12/2014 | Schubert | ................. | G01N 23/203 378/7 |
| 8,903,046 B2 * | 12/2014 | Morton | ................. | G01V 5/0025 378/88 |
| 8,908,831 B2 * | 12/2014 | Bendahan | ................. | G01V 5/0041 378/86 |
| 8,923,481 B2 * | 12/2014 | Schubert | ................. | G01N 23/203 378/86 |
| 9,031,188 B2 * | 5/2015 | Belcher | ................. | G01N 9/36 378/58 |
| 9,036,781 B1 * | 5/2015 | Safai | ................. | G01N 23/00 378/86 |
| 9,057,679 B2 * | 6/2015 | Morton | ................. | G01V 5/0066 |
| 9,123,450 B2 * | 9/2015 | Liesenfelt | ................. | G01N 23/203 |
| 9,146,201 B2 * | 9/2015 | Schubert | ................. | G01N 23/203 |
| 9,151,721 B2 * | 10/2015 | Safai | ................. | H01J 35/04 |
| 9,285,488 B2 * | 3/2016 | Arodzero | ................. | G01V 5/0016 |
| 9,594,033 B2 * | 3/2017 | Georgeson | ................. | G01V 5/0016 |
| 9,685,247 B2 * | 6/2017 | Kang | ................. | G21F 3/00 |
| 9,689,813 B2 * | 6/2017 | Lou | ................. | G01N 23/203 |
| 9,739,727 B2 * | 8/2017 | Safai | ................. | G01N 23/203 |
| 9,778,391 B2 * | 10/2017 | Chen | ................. | G01N 23/046 |
| 9,791,590 B2 * | 10/2017 | Morton | ................. | G01V 5/0016 |
| 9,846,257 B2 * | 12/2017 | Chen | ................. | G01N 23/203 |
| 9,846,258 B2 * | 12/2017 | Chen | ................. | G01V 5/0025 |
| 9,897,716 B2 * | 2/2018 | Kang | ................. | G01V 5/0016 |
| 9,989,483 B2 * | 6/2018 | Georgeson | ................. | G21K 1/043 |
| 10,007,022 B2 * | 6/2018 | Zong | ................. | G01V 5/0066 |
| 10,126,459 B2 * | 11/2018 | Wurzbach | ................. | G01V 5/0025 |
| 10,168,445 B2 * | 1/2019 | Morton | ................. | G01N 23/203 |
| 10,317,349 B2 * | 6/2019 | Engel | ................. | G01N 23/203 |

(56) References Cited

U.S. PATENT DOCUMENTS

| | | | |
|---|---|---|---|
| 10,481,113 B2* | 11/2019 | Arodzero | G01V 5/0066 |
| 10,502,697 B2* | 12/2019 | Georgeson | G01N 23/203 |
| 10,578,565 B2* | 3/2020 | Safai | G01N 23/083 |
| 10,585,052 B2* | 3/2020 | Chen | G01N 23/203 |
| 10,656,304 B2* | 5/2020 | Grodzins | G21K 1/02 |
| 10,762,998 B2* | 9/2020 | Rothschild | G01V 5/0041 |
| 10,782,246 B2* | 9/2020 | Zong | G01N 23/04 |
| 2004/0256565 A1 | 12/2004 | Adams et al. | |
| 2012/0263276 A1 | 10/2012 | Schubert et al. | |
| 2014/0211916 A1 | 7/2014 | Morton | |

FOREIGN PATENT DOCUMENTS

| | | |
|---|---|---|
| CN | 103661126 A | 3/2014 |
| CN | 105403926 A | 3/2016 |
| CN | 106053499 A | 10/2016 |
| CN | 106290427 A | 1/2017 |
| CN | 106383132 A | 2/2017 |
| CN | 206074828 U | 4/2017 |
| CN | 206497215 U | 9/2017 |
| CN | 105003458 A | 5/2018 |
| CN | 108227027 A | 6/2018 |
| CN | 2078177229 U | 9/2018 |
| EP | 2884269 A1 | 6/2015 |
| RU | 2334219 C2 | 9/2008 |
| WO | 0033060 A2 | 6/2000 |

OTHER PUBLICATIONS

EP Search Report dated May 28, 2019 in the corresponding EP application (application No. 18215135.7).

Russia Search Report received on Sep. 26, 2019 in the corresponding RU application (applicationNo. 2018146138/28).

* cited by examiner

VEHICLE-MOUNTED TYPE BACK SCATTERING INSPECTION SYSTEM

CROSS-REFERENCES TO RELATED APPLICATIONS

The present application claims priority from Chinese application number CN201711466746.1 filed Dec. 29, 2017, which is herein incorporated by reference.

FIELD

The present disclosure relates to the technical field of safety inspection, and in particular to a vehicle-mounted type back scattering inspection system.

BACKGROUND

The X-ray back scattering imaging technique is a technique for imaging by detecting back scattering photons of an object while using a pen-shaped X-ray beam to illuminate the object. In a vehicle-mounted type back scattering inspection system, an X-ray back scattering imaging device is installed in a carriage to perform scattering ray imaging on the inspected object. The appearance of the system is not much different from that of an ordinary van, so it has good inspection concealment: the system can perform scanning while passing by a scanned vehicle that is parked on the roadside or in a parking lot, and generate a scanned image in real time. In addition, the system also has good maneuverability and can be quickly transferred for use in different occasions.

However, the vehicle-mounted type back scattering inspection system has some limitations, and cannot work in places where the vehicle cannot reach, such as narrow areas where the vehicle cannot enter, explosion site, etc.

SUMMARY

The objective of the present disclosure is to provide a vehicle-mounted type back scattering inspection system to expand the applicable range of the vehicle-mounted type back scattering inspection system.

The present disclosure provides a vehicle-mounted type back scattering inspection system, including a carriage and a back scattering imaging device, the back scattering imaging device has a vehicle-mounted working state and a ground working state, and in the vehicle-mounted working state, the back scattering imaging device performs inspection work in the carriage; in the ground working state, the back scattering imaging device performs the inspection work on the ground at the outside of the carriage; and the back scattering imaging device is separately arranged relative to the carriage and is movable between the carriage and the ground so as to switch between the vehicle-mounted working state and the ground working state.

In some embodiments of the present disclosure, the back scattering imaging device includes wheels at the bottom.

In some embodiments of the present disclosure, in the vehicle-mounted working state, the wheels are self-locked to prevent the wheels from rolling; and during switching from the vehicle-mounted working state into the ground working state, the wheels are unlocked to roll from the carriage to the ground.

In some embodiments of the present disclosure, the vehicle-mounted type back scattering inspection system further includes a position locking device, the position locking device has a locked position and an unlocked position, and in the vehicle-mounted working state, the position locking device is at the locked position to prevent the back scattering imaging device from moving; and in the ground working state, the position locking device is at the unlocked position to enable the back scattering imaging device to move.

In some embodiments of the present disclosure, the back scattering imaging device includes a back scattering imaging module and a carrier module for carrying the back scattering imaging module, and the module is configured to drive the back scattering imaging module to move.

In some embodiments of the present disclosure, the vehicle-mounted type back scattering inspection system further includes a channel structure, and the channel structure is used for providing a channel for the back scattering imaging device to move between the carriage and the ground.

In some embodiments of the present disclosure, the carriage includes a carriage body having an opening, and the channel structure includes a plate body arranged at the opening, wherein the plate body is rotatably arranged relative to the carriage body to form an inclined plane extending from the carriage body to the ground, the back scattering imaging device is configured to be movable along the inclined plane to leave or enter the carriage body; and/or, the plate body is movably arranged along vertical direction to drive the back scattering imaging device to move between the height where the carriage body is located and the ground.

In some embodiments of the present disclosure, the plate body is used for opening or closing the opening of the carriage body, and in the vehicle-mounted working state, the plate body closes the opening; and during switching between the vehicle-mounted working state and the ground working state, the plate body opens the opening.

In some embodiments of the present disclosure, the vehicle-mounted type back scattering inspection system further includes a controller arranged in the carriage and coupled with the back scattering imaging device, and in the vehicle-mounted working state, the controller controls the back scattering imaging device to work; and in the ground working state, the controller remotely controls the back scattering imaging device to work.

In some embodiments of the present disclosure, the vehicle-mounted type back scattering inspection system further includes a power supply device, and the power supply device is used for supplying power to the back scattering imaging device in the movement or the inspection work.

In some embodiments of the present disclosure, the power supply device includes an electrical connector for electrical connection with the mains supply and/or a generator and/or a battery.

In some embodiments of the present disclosure, the power supply device includes an electrical connector for electrical connection with the mains supply, a generator and a battery, the generator is fixedly arranged in the carriage, the back scattering imaging device includes the battery and a back scattering imaging module, and in the vehicle-mounted working state, the electrical connector is electrically connected with the mains supply for supplying power to the back scattering imaging module or charging the battery, or the generator supplies power to the back scattering imaging module and/or charges the battery; and in the ground working state, the battery supplies power to the back scattering imaging device in the movement or the inspection work.

In some embodiments of the present disclosure, the scanning range of the back scattering imaging device is variable.

In some embodiments of the present disclosure, the back scattering imaging device includes a back scattering imaging module, and the back scattering imaging module is rotatably arranged to change the scanning range of the back scattering imaging device.

In some embodiments of the present disclosure, the back scattering imaging module is rotatably arranged around a vertical shaft.

In some embodiments of the present disclosure, the vehicle-mounted type back scattering inspection system further includes a tray arranged in the carriage and rotatably arranged relative to the carriage, and in a vehicle-mounted working state, the back scattering imaging device is fixedly arranged on the tray to rotate under the drive of the tray.

In some embodiments of the present disclosure, the back scattering imaging device includes a back scattering imaging module and a carrier module for carrying the back scattering imaging module, and the back scattering imaging module is rotatably arranged relative to the carrier module.

In some embodiments of the present disclosure, the back scattering imaging device includes a back scattering imaging module, the back scattering imaging module includes a ray source and a detector.

In some embodiments of the present disclosure, the vehicle-mounted type back scattering inspection system further includes a face recognition device and/or a millimeter wave imaging device arranged in the carriage.

Based on the technical solution provided by the present disclosure, the back scattering imaging device has a vehicle-mounted working state and a ground working state, and in the vehicle-mounted working state, the back scattering imaging device performs inspection work in the carriage; in the ground working state, the back scattering imaging device performs the inspection work on the ground at the outside of the carriage; and the back scattering imaging device is separately arranged relative to the carriage and is movable between the carriage and the ground so as to switch between the vehicle-mounted working state and the ground working state. The back scattering imaging device of the vehicle-mounted type back scattering inspection system is separately arranged relative to the carriage and is movable between the carriage and the ground, compared with the vehicle-mounted type back scattering inspection system in the prior art, in a scene where the vehicle cannot enter, the back scattering imaging device can move from the carriage to the ground to switch to the ground working state so as to perform the inspection work, thereby expanding the applicable range of vehicle-mounted type back scattering inspection system.

Other features of the present disclosure and advantages thereof will become apparent from the following detailed description of exemplary embodiments of the present disclosure with reference to the drawings.

BRIEF DESCRIPTION OF THE DRAWINGS

The drawings described herein are intended to provide a further understanding of the present disclosure, and constitute a part of the present application. The illustrative embodiments of the present disclosure and the descriptions thereof are used for explaining the present disclosure and do not constitute undue limitations of the present disclosure. In the drawings.

Figure 1:
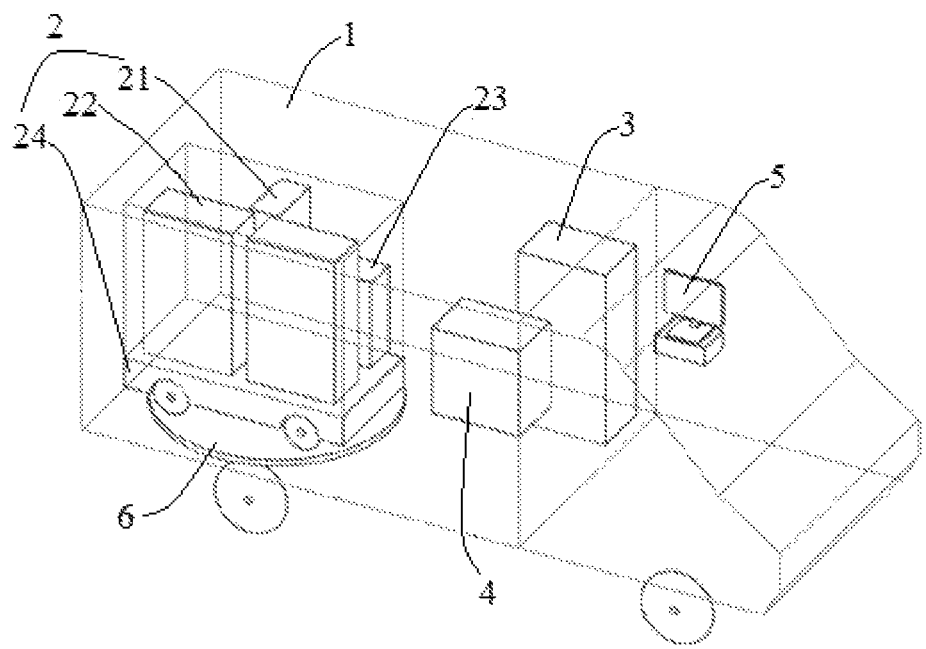
FIG. 1 is a structural schematic diagram of a vehicle-mounted type back scattering inspection system in an embodiment of the present disclosure.

Reference signs: 1—carriage; 11—carriage body; 12—plate body; 2—back scattering imaging device; 21 ray source; 22—detector; 23—battery; 24—carrier module; 3—generator; 4—signal transceiving device; 5—system workstation; 6—tray; Q—inspected object; 7—electrical connector; 8—face recognition device; 9—millimeter—wave imaging device; 10—position locking device; 20—mains supply.

DETAILED DESCRIPTION OF THE INVENTION

The technical solutions in the embodiments of the present disclosure are clearly and completely described below with reference to the drawings in the embodiments of the present disclosure. Obviously, the described embodiments are only a part of the embodiments of the present disclosure, but not all embodiments. The following descriptions of at least one exemplary embodiment are merely illustrative, and are in no way to limit the present disclosure or the application thereof or the use thereof. All other embodiments obtained by those skilled in the art based on the embodiments of the present disclosure without creative efforts shall all fall within the protection scope of the present disclosure.

The relative arrangements of the components and the steps, numerical expressions and numerical values set forth in these embodiments are not intended to limit the scope of the present disclosure, unless otherwise specified. Moreover, it should be understood that for the convenience of description, the dimensions of the various parts shown in the drawings are not drawn in the actual scale relationship for the convenience of description. Techniques, methods and devices known to those of ordinary skill in the related art may not be discussed in detail, but under suitable circumstances, the techniques, the methods and the devices should be considered as a part of the specification as granted. In all examples shown and discussed herein, any specific values should be construed as illustrative only and are not used as limitations. Accordingly, other examples of the exemplary embodiments may have different values. It should be noted that similar reference signs and letters represent similar items in the following drawings, and therefore, once a certain item is defined in one drawing, it does not need to be further discussed in the subsequent drawings.

For the convenience of description, spatially relative terms such as "at the upper side of . . . ", "above . . . ", "on the upper surface of . . . ", "on . . . " and the like may be used herein to describe the spatial positional relationship of one device or feature with other devices or features in the drawings shown herein. It should be understood that the spatially relative terms are intended to encompass different orientations in use or operation in addition to the orientations of the device described in the drawings. For example, if the device in the drawing is inverted, the device described as being "above other devices or configurations" or "on other devices or configurations" will be positioned "below the other devices or configurations" or "under the other devices or configurations." Thus, the exemplary term "above . . . " can include both "at the upper side of . . . " and "at the lower side of . . . ". The device can also be positioned in other different ways (rotated 90 degrees or at other orientations) and the spatial relative descriptions used herein are explained accordingly.

Figure 2:
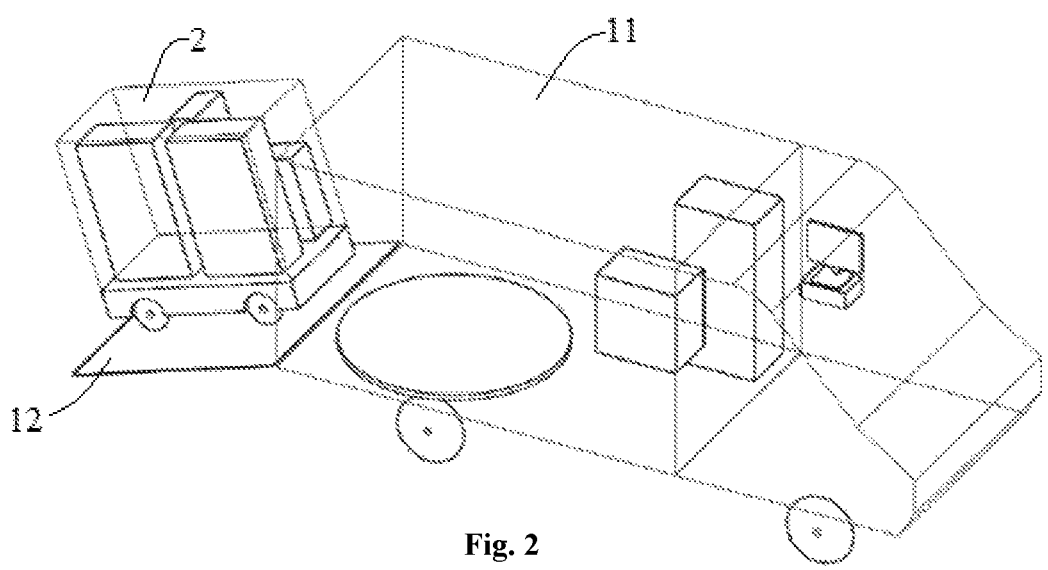
FIG. 2 is a structural schematic diagram of an embodiment in which a back scattering imaging device in FIG. 1 moves from a carriage to the ground.
Figure 3:
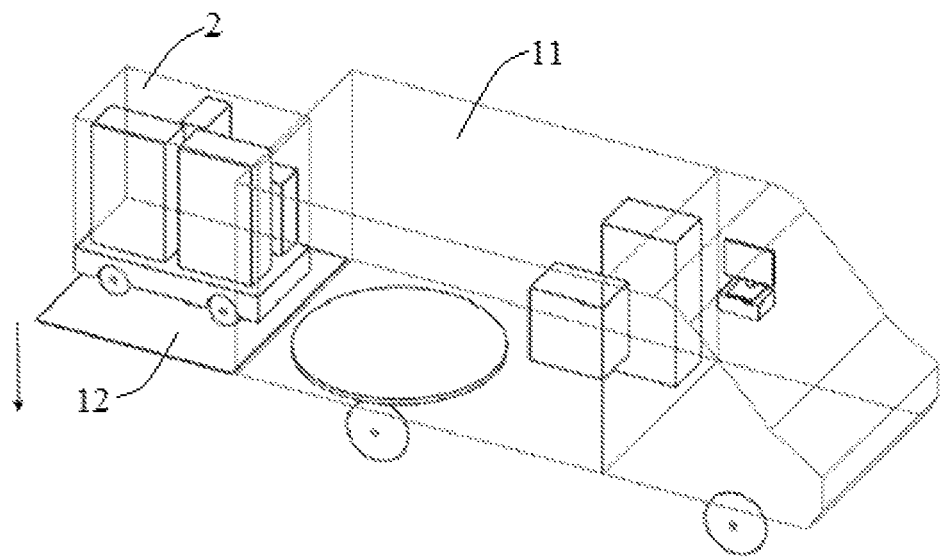
FIG. 3 is a structural schematic diagram of another embodiment in which the back scattering imaging device in FIG. 1 moves from the carriage to the ground.
Figure 4:
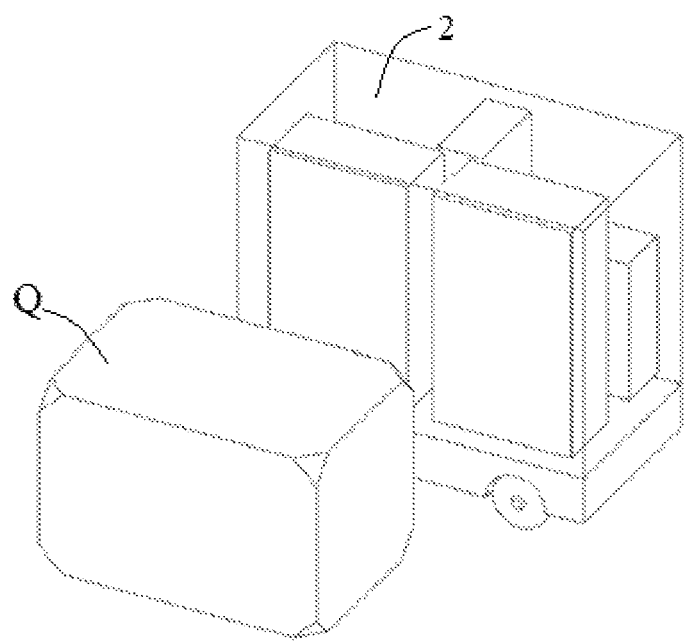
FIG. 4 is a structural schematic diagram of the back scattering imaging device as shown in FIG. 1 in a ground working state.

As shown in FIGS. 1 to 7, the vehicle-mounted type back scattering inspection system of the embodiment of the present disclosure includes a carriage 1 and a back scattering imaging device 2. The back scattering imaging device 2 has a vehicle-mounted working state and a ground working state. As shown in FIG. 1, in the vehicle-mounted working state, the back scattering imaging device 2 performs inspection work in the carriage 1. As shown in FIG. 4, in the ground working state, the back scattering imaging device 2 performs the inspection work on the ground at the outside of the carriage 1. The back scattering imaging device 2 of the present embodiment is separately arranged relative to the carriage 1 and is movable between the carriage 1 and the ground to switch between the vehicle-mounted working state and the ground working state.

The back scattering imaging device 2 of the vehicle-mounted type back scattering inspection system is separately arranged relative to the carriage 1 and is movable between the carriage 1 and the ground, compared with the vehicle-mounted type back scattering inspection system in the prior art, in a scene where the vehicle cannot enter, the back scattering imaging device 2 can move from the carriage 1 to the ground to switch to the ground working state so as to perform the inspection work, thereby expanding the applicable range of vehicle-mounted type back scattering inspection system.

For example, when it needs to inspect a narrow area inaccessible to the vehicle, the back scattering imaging device 2 of the present embodiment can be controlled to leave the carriage 1 and move to the above-mentioned narrow area to perform the inspection work. For example, in some dangerous places that are highly dangerous and inconvenient for drivers to enter by driving the vehicles, the back scattering imaging device 2 can be remotely controlled to enter the dangerous places to perform the inspection work.

The back scattering imaging device 2 of the present embodiment includes a back scattering imaging module and a carrier module 24 for carrying the back scattering imaging module.

As shown in FIG. 1, the back scattering imaging module of the present embodiment includes a ray source device 21 and a detector 22. The ray source device 21 includes a ray source and a flying point device.

The back scattering imaging module of the present embodiment includes two detectors 22. The ray source device 21 is arranged between the two detectors 22 and emits rays outward from the space between the two detectors 22.

In other embodiments not shown in the drawings, the back scattering imaging module can also include a detector.

The carrier module 24 drives the back scattering imaging module to move. The carrier module 24 is located below the back scattering imaging module, carries the back scattering imaging module and has the walking capability, and the back scattering imaging module is arranged above the carrier module 24, so the back scattering imaging module moves under the drive of the carrier module 24.

In other embodiments not shown in the drawings, the back scattering imaging device 2 can further include a driving device for driving the back scattering imaging module to move. For example, the driving device can be located on the front side of the back scattering imaging module to pull the back scattering imaging module, and can also be located on the back side of the back scattering imaging module to push the back scattering imaging module.

Since there is a certain height between the carriage 1 and the ground, in order to facilitate the movement of the back scattering imaging device 2, the vehicle-mounted type back scattering inspection system of the present embodiment includes a channel structure. The channel structure is used for providing a channel for the back scattering imaging device 2 to move between the carriage 1 and the ground.

The carriage 1 includes a carriage body 11 having an opening. The channel structure includes a plate body 12 arranged at the opening. In one embodiment, as shown in FIG. 2, the plate body 12 is rotatably arranged relative to the carriage body 11 to form an inclined plane extending from the carriage body 11 toward the ground, and the back scattering imaging device 2 is configured to be movable along the inclined plane to leave or enter the carriage body 11. In another embodiment, as shown in FIG. 3, the plate body 12 is movably arranged along vertical direction to drive the back scattering imaging device 2 to move between the height where the carriage body 11 is located and the height where the ground is located.

The vehicle-mounted type back scattering inspection system provides a channel for the movement of the back scattering imaging device 2, so that the back scattering imaging device 2 can smoothly move from the carriage 1 to the ground, thereby protecting the back scattering imaging device 2 from vibration while moving from the carriage 1 to the ground to affect the performance of the back scattering imaging device 2.

Figure 8:
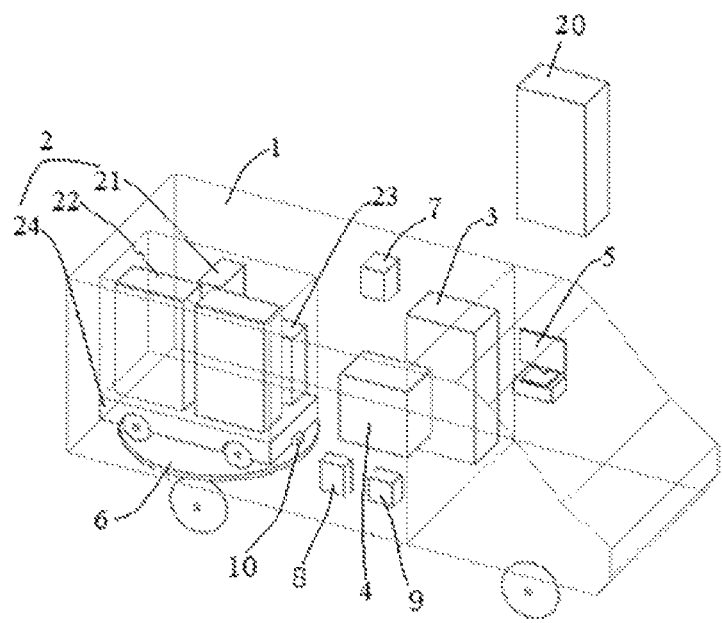
FIG. 8 is a structural schematic diagram of a vehicle-mounted type back scattering inspection system in an embodiment of the present disclosure.

In some embodiments of the present disclosure, the vehicle-mounted type back scattering inspection system further includes a power supply device, and the power supply device supplies power to the back scattering imaging device 2 in the movement or the inspection work. As shown in FIG. 8, the power supply device includes an electrical connector 7 for electrical connection with the mains supply 20, a generator 3 and a battery 23.

In the vehicle-mounted working state, the back scattering imaging device 2 is powered by the mains supply 20 or the generator 3; and in the ground working state, the back scattering imaging device 2 is powered by the battery 23. Moreover, in the vehicle-mounted working state, the battery 23 can be charged by the mains supply 20 or the generator 3.

The back scattering imaging device 2 of the present embodiment further includes a battery 23. The battery 23 provides power for the inspection work of the back scattering imaging module and the movement of the carrier module 24.

In some embodiments of the present disclosure, the scanning range of the back scattering imaging device 2 of the embodiment of the present disclosure is variably set, so that the inspection range of the back scattering imaging device 2 can be expanded.

In the present embodiment, the back scattering imaging module is rotatably arranged around a vertical shaft so that the scanning range of the back scattering imaging device 2 is variable.

Figure 5:
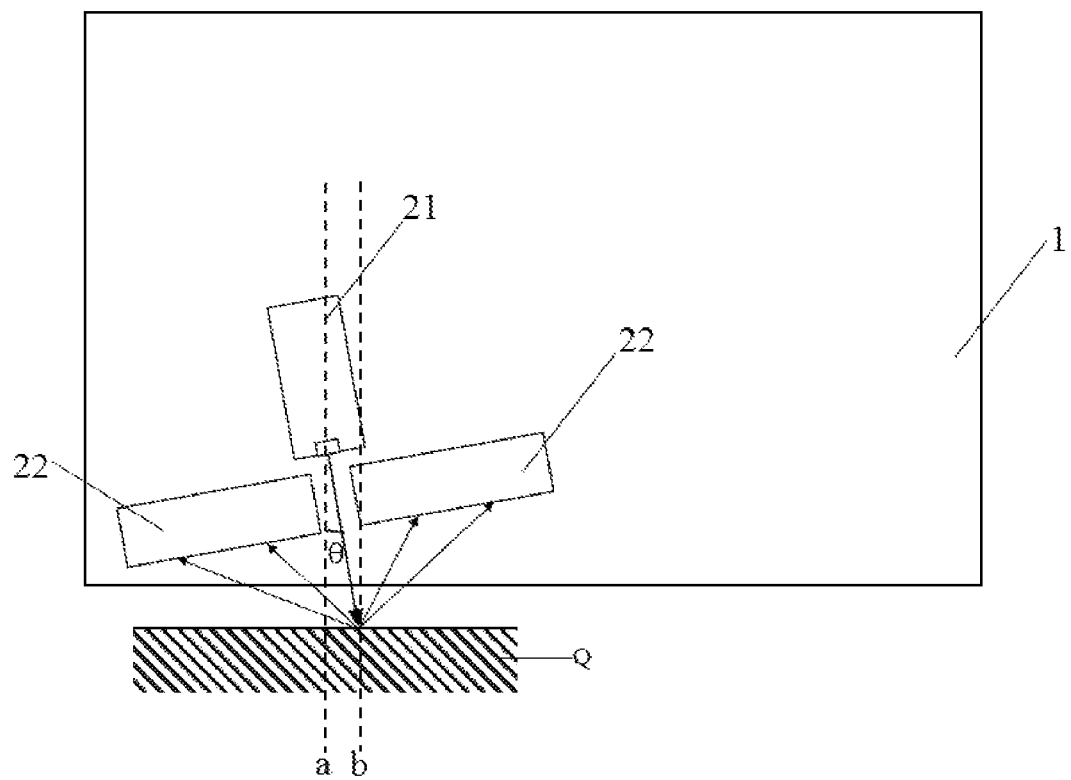
FIGS. 5 to 7 are schematic diagrams illustrating the back scattering imaging device as shown in FIG. 1 rotates under the drive of a tray to change the scanning range.
Figure 6:
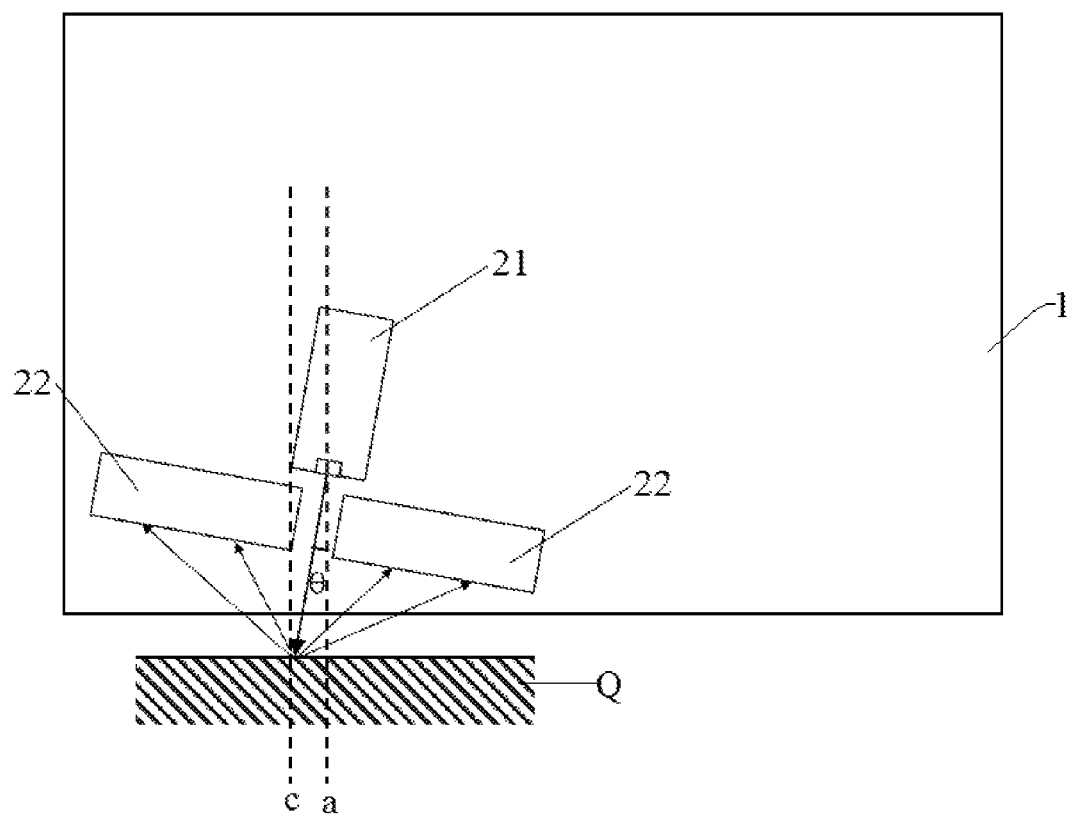
Figure 7:
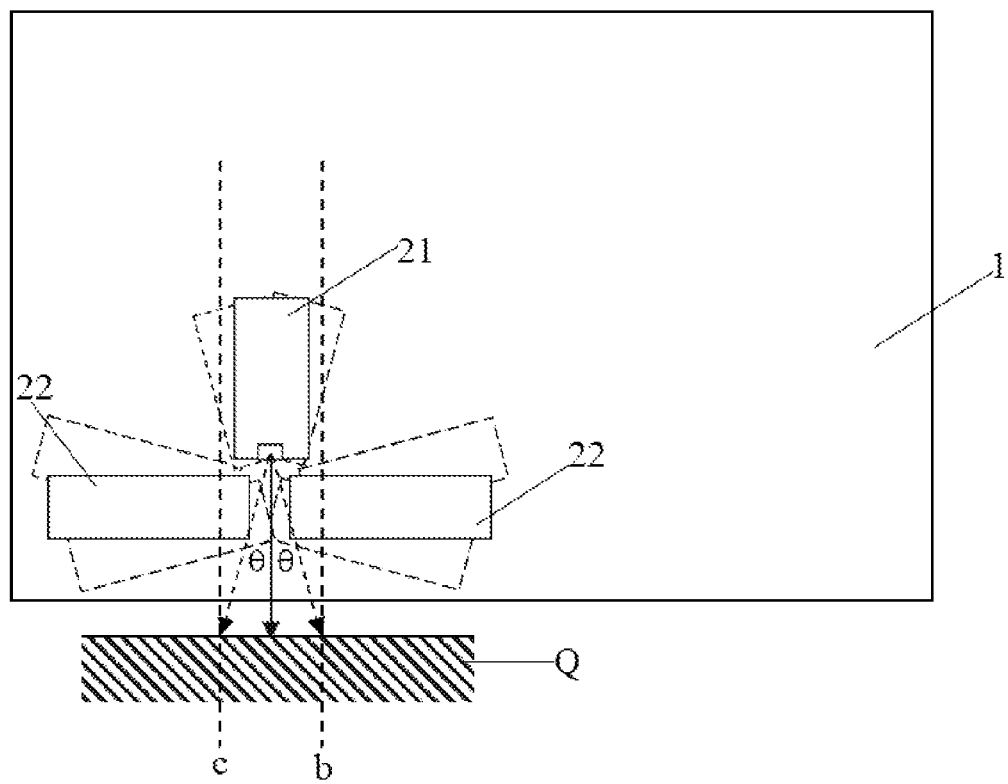

As shown in FIGS. 5 to 7, when the back scattering imaging module is not rotatable, in the case that the back scattering imaging module and an inspected object Q are both fixed, the back scattering imaging module can only perform imaging inspection on a plane a of the inspected object Q.

When the back scattering imaging module rotates an angle θ around the vertical shaft counterclockwise, the back scattering imaging module performs the imaging inspection on a plane b of the inspected object Q. When the back scattering imaging module rotates the angle θ around the vertical shaft clockwise, the back scattering imaging module performs the imaging inspection on a plane c of the inspected object Q. Therefore, the back scattering imaging module of the present embodiment is capable of imaging an area between the plane b and the plane c of the inspected object Q.

In some embodiments of the present disclosure, in the inspection system, a suitable angle interval can is set within a rotatable angle of the back scattering imaging module.

The back scattering imaging device 2 of the present embodiment can expand the inspection range and scan the inspected object Q within a certain range when the back scattering imaging device 2 itself cannot move back and forth and the inspected object Q cannot move back and forth. Moreover, the back scattering imaging device 2 can also perform key inspection on a suspect area when it has been positioned in the suspect area.

The above angle θ can be a small angle to achieve the key inspection. It can also be a large angle to achieve wide-range inspection of the inspected object without moving.

In some embodiments of the present disclosure, the range of θ is [−45°, 45°].

In order to realize the rotation of the back scattering imaging module, as shown in FIG. 1, the vehicle-mounted type back scattering inspection system of the present embodiment further includes a tray 6 located in a carriage 1. The back scattering imaging device 2 is arranged on the tray 6, and the tray 6 is rotatably arranged relative to the carriage 1 to drive the back scattering imaging device 2 to rotate.

In some embodiments of the present disclosure, the back scattering imaging module is rotatably arranged relative to a carrier module 24. Due to such configuration, the back scattering imaging device 2 can change the scanning range both in a vehicle-mounted working state and a ground working state.

When the vehicle-mounted type back scattering inspection system is in the vehicle-mounted working state, the vehicle-mounted type back scattering inspection system can control the tray 6 to rotate or the vehicle-mounted type back scattering inspection system can control the back scattering imaging module to rotate relative to the carrier module 24 to change the scanning range. In the ground working state, the vehicle-mounted type back scattering inspection system can control the back scattering imaging module to rotate relative to the carrier module 24 to change the scanning range.

The included angle between a beam emitting direction of rays and transverse direction of the vehicle is changed from 0 to θ in the vehicle-mounted type back scattering inspection system of the present embodiment so as to scan the inspected object Q within a certain range when neither the inspection system nor the inspected object Q moves. Moreover, key inspection can also be performed on a suspected area of the inspected object Q on which the initial scanning is completed.

The structure of the vehicle-mounted type back scattering inspection system according to a specific embodiment of the present disclosure will be described in detail below with reference to FIGS. 1 to 7.

As shown in FIG. 1, the vehicle-mounted type back scattering inspection system of the present embodiment includes a carriage 1, a back scattering imaging device 2, a generator 3, a signal transceiving device 4, and a system workstation 5.

The signal transceiving device 4 comprises a controller that is coupled to the back scattering imaging device 2 and is fixedly arranged in the carriage 1. In the vehicle-mounted working state, the signal transceiving device 4 controls the back scattering imaging device 2 to perform inspection work. In the ground working state, the signal transceiving device 4 remotely controls the movement and the inspection work of the back scattering imaging device 2.

The system workstation 5 is used for receiving a scanned image sent by the back scattering imaging device 2.

In some embodiments of the present disclosure, the back scattering imaging device 2 transmits the scanned image to the system workstation 5 in a wireless manner.

In the present embodiment, as shown in FIG. 1, the back scattering imaging device 2 is located on one side in the width direction in the carriage 1. Therefore, the back scattering imaging device 2 can perform scanning inspection on the inspected object Q passing by one side of the carriage 1. Of course, the back scattering imaging device 2 can also be located on the back side in the carriage 1 or on the other side in the width direction.

The back scattering imaging device 2 of the present embodiment includes a back scattering imaging module, a battery 23 and a carrier module 24 located below the back scattering imaging module and the battery 23. The carrier module 24 drives the back scattering imaging module and the battery 23 to move. The battery 23 supplies power for the movement of the carrier module 24 and the inspection work of the back scattering imaging module.

When the back scattering imaging device 2 is in the vehicle-mounted working state, the generator 3 supplies power to the back scattering imaging module and charges the battery 23. In the ground working state, the battery 23 supplies power to the back scattering imaging module and the carrier module 24. Of course, the battery 23 can also supplies power to the back scattering imaging module in the vehicle-mounted working state.

In the vehicle-mounted working state, the vehicle-mounted type back scattering inspection system can not only control the vehicle to move to inspect the passing inspected vehicles, containers, and the like, and the vehicle can also be parked on the roadside or in the vicinity of a security checkpoint to inspect the inspected vehicles passing by its side face in a concealed manner, and at this time, the work of the back scattering imaging device 2 can be powered by the mains supply 20.

In other embodiments not shown in the drawings, the battery 23 can be configured to be replaceable. At this time, the battery 23 can be charged by a device other than the vehicle-mounted type back scattering inspection system. After the battery 23 is exhausted, another charged battery 23 is directly used for replacing the exhausted battery 23.

In the present embodiment, as shown in FIG. 1, the back scattering imaging module includes a ray source device 21 and two detectors 22 respectively located on both sides of the ray source device 21.

The carrier module 24 of the present embodiment includes wheels at the bottom. When the carrier module moves, the wheels roll to reduce the friction.

In the present embodiment, as shown in FIG. 1, the vehicle-mounted type back scattering inspection system further includes a tray 6 located in the carriage 1, and the back scattering imaging device 2 is arranged on the tray 6. In the vehicle-mounted working state, the back scattering imaging device 2 is fixedly arranged on the tray 6, and at this time, in order to prevent the back scattering imaging device 2 from moving and separating from the tray 6, the wheels of the present embodiment can be self-locked. When the back scattering imaging device 2 needs switch to the ground working state, the wheels are unlocked to roll from the carriage 1 to the ground.

In order to improve the movement convenience of the carrier module 24, the wheels of the present embodiment are Mecanum wheels. Due to such configuration, the omnidirectional movement of the carrier module 24 is facilitated to facilitate the omnidirectional movement of the entire back scattering imaging device 2. Moreover, the Mecanum wheels of the present embodiment have a self-locking function.

In an embodiment as shown in FIG. 8, the vehicle-mounted type back scattering inspection system includes a position locking device 10. The position locking device 10 has a locked position and an unlocked position. In the vehicle-mounted working state, the position locking device 10 is at the locked position to prevent the back scattering imaging device 2 from moving. In the ground working state, the position locking device 10 is at the unlocked position to enable the back scattering imaging device 2 to move.

As shown in FIG. 2, the carriage 1 includes a carriage body 11 having an opening. The channel structure includes a plate body 12 arranged at the opening.

As shown in FIG. 2, in one embodiment, the plate body 12 is rotatably arranged relative to the carriage body 11 to form an inclined plane extending from the carriage body 11 toward the ground, and the back scattering imaging device 2 may move along the inclined plane to leave or enter the carriage body 11.

As shown in FIG. 3, in another embodiment, the plate body 12 is movably arranged in vertical direction to drive the back scattering imaging device 2 to move between the height where the carriage body 11 is located and the height where the ground is located. The back scattering imaging device 2 firstly moves from the tray 6 onto the plate body 12, and then the plate body 12 causes the back scattering imaging device 2 to move downward to the ground, and the back scattering imaging device 2 moves from the plate body 12 to the ground.

In an embodiment not shown in the drawings, the plate body 12 can also be controlled to lower to a certain height between the carriage body 11 and the ground, and then the plate body 12 is controlled to rotate and forms the inclined plane with the ground, so that the back scatter imaging device 2 moves to the ground along the inclined plane.

In the present embodiment, the carriage 1 further includes a carriage door for opening or closing the opening of the carriage body 11. After the carriage door is opened, the back scattering imaging device 2 moves to the ground along the inclined plane formed by the plate body 12.

In other embodiments not shown in the drawings, the plate body 12 can directly serve as the carriage door for opening or closing the carriage body 11. At this time, the plate body 12 serves as the passage structure for providing the passage for the movement of the back scattering imaging device 2 after the opening of the carriage body 11 is opened. Due to such configuration, the vehicle-mounted type back scattering inspection system is provided with no special channel structure, and multi-purpose of one object is achieved, so that the structure of the vehicle-mounted type back scattering inspection system is simplified, and the cost is reduced.

The process when the back scattering imaging device 2 moves from the carriage 1 to the ground is as shown above. The process when the back scattering imaging device 2 moves from the ground to the inside of the carriage body 11 is reverse to the above process, and thus will not be repeated herein.

In order to make the scanning range of the back scattering imaging device 2 variable, the tray 6 of the present embodiment is rotatably arranged relative to the carriage 1. In the vehicle-mounted working state, the back scattering imaging device 2 is fixedly arranged on the tray 6 to rotate under the drive of the tray 6. Moreover, the back scattering imaging module is rotatably arranged relative to the carrier module 24. In the vehicle-mounted working state, the vehicle-mounted type back scattering inspection system is controlled to make the tray 6 rotate or the back scattering imaging module rotate relative to the carrier module 24 so as to change the scanning range. In the ground working state, the vehicle-mounted type back scattering inspection system may be controlled to make the back scattering imaging module rotate relative to the carrier module 24 so as to change the scanning range.

As shown in FIG. 5, when the tray 6 rotates an angle θ around the vertical shaft counterclockwise, the back scattering imaging module performs the imaging inspection on a plane b of the inspected object Q. When the tray 6 rotates the angle θ around the vertical shaft clockwise, the back scattering imaging module performs the imaging inspection on a plane c of the inspected object Q. Therefore, the back scattering imaging module of the present embodiment is capable of imaging an area between the plane b and the plane c of the inspected object Q. Therefore, the back scattering imaging device of the present embodiment can expand the inspection range when itself cannot move back and forth and the inspected object cannot move back and forth.

In some embodiments of the present disclosure, as shown in FIG. 8, the vehicle-mounted type back scattering inspection system of the present embodiment further includes a face recognition device 8 and/or a millimeter wave imaging device 9 arranged in the carriage 1. In the vehicle-mounted working state, the face recognition device 8 and the millimeter wave imaging device 9 can perform active or concealed inspection on personnel passing through the carriage 1. During the concealed inspection, when a person is close enough to the carriage 1, the inspection system can capture a human body millimeter wave map and a face image.

What is claimed is:

1. A vehicle-mounted type back scattering inspection system, comprising:
   a carriage and a back scattering imaging device, wherein the back scattering imaging device has a vehicle-mounted working state and a ground working state, and in the vehicle-mounted working state, the back scattering imaging device performs an inspection work in the carriage; in the ground working state, the back scattering imaging device performs an inspection work on the ground at an outside of the carriage; and the back scattering imaging device is separately arranged relative to the carriage and is movable between the carriage and the ground to switch between the vehicle-mounted working state and the ground working state; and a channel structure, configured to provide a channel for the back scattering imaging device to move between the carriage and the ground.

2. The vehicle-mounted type back scattering inspection system according to claim 1, wherein the back scattering imaging device comprises wheels at a bottom.

3. The vehicle-mounted type back scattering inspection system according to claim 2, wherein in the vehicle-mounted working state, the wheels are self-locked to prevent the wheels from rolling; and during switching from the vehicle-mounted working state into the ground working state, the wheels are unlocked to roll from the carriage to the ground.

4. The vehicle-mounted type back scattering inspection system according to claim 1, further comprising a position locking device, wherein the position locking device has a locked position and an unlocked position, and in the vehicle-mounted working state, the position locking device is at the locked position to prevent the back scattering imaging device from moving; and in the ground working state, the position locking device is at the unlocked position to enable the back scattering imaging device to move.

5. The vehicle-mounted type back scattering inspection system according to claim 1, wherein the back scattering imaging device comprises a back scattering imaging module and a carrier module for carrying the back scattering imaging module, and the carrier module is configured to drive the back scattering imaging module to move.

6. The vehicle-mounted type back scattering inspection system according to claim 1, wherein the carriage comprises a carriage body having an opening, and the channel structure comprises a plate body arranged at the opening, wherein the plate body is rotatably arranged relative to the carriage body to form an inclined plane extending from the carriage body to the ground, the back scattering imaging device is configured to be movable along the inclined plane to leave or enter the carriage body; and/or, the plate body is movably arranged along a vertical direction to drive the back scattering imaging device to move between a height where the carriage body is located and the ground.

7. The vehicle-mounted type back scattering inspection system according to claim 6, wherein the plate body is configured to open or close the opening of the carriage body, and in the vehicle-mounted working state, the plate body closes the opening; and during switching between the vehicle-mounted working state and the ground working state, the plate body opens the opening.

8. The vehicle-mounted type back scattering inspection system according to claim 1, further comprising a signal transceiving device arranged in the carriage and coupled with the back scattering imaging device, wherein in the vehicle-mounted working state, the signal transceiving device controls the back scattering imaging device to work; and in the ground working state, the signal transceiving device remotely controls the back scattering imaging device to work.

9. The vehicle-mounted type back scattering inspection system according to claim 1, further comprising a power supply device configured to supply power to the back scattering imaging device in a movement or the inspection work.

10. The vehicle-mounted type back scattering inspection system according to claim 9, wherein the power supply device comprises a generator and/or a battery and/or an electrical connector for electrical connection with a mains supply, and/or the generator, and/or the battery.

11. The vehicle-mounted type back scattering inspection system according to claim 9, wherein the power supply device comprises a generator and/or a battery and/or an electrical connector configured to be electrically connected with a mains supply, the generator and the battery, the generator is fixedly arranged in the carriage, the back scattering imaging device comprises a battery and a back scattering imaging module, and in the vehicle-mounted working state, the electrical connector is electrically connected with the mains supply for supplying power to the back scattering imaging module and/or charging the battery, or the generator supplies power to the back scattering imaging module and/or charges the battery; and in the ground working state, the battery supplies power to the back scattering imaging device in a movement or the inspection work.

12. The vehicle-mounted type back scattering inspection system according to claim 1, further comprising:

a tray arranged in the carriage and rotatably arranged relative to the carriage, wherein in a vehicle-mounted working state, the back scattering imaging device is fixedly arranged on the tray to rotate under a drive of the tray;

wherein the back scattering imaging device comprises a back scattering imaging module and a carrier module for carrying the back scattering imaging module, the back scattering imaging module is rotatably arranged relative to the carrier module, and the back scattering imaging module is rotatably arranged to change a scanning range of the back scattering imaging device.

13. The vehicle-mounted type back scattering inspection system according to claim 12, wherein the back scattering imaging module is rotatably arranged around a vertical shaft.

14. The vehicle-mounted type back scattering inspection system according to claim 1, the back scattering imaging device includes a back scattering imaging module, the back scattering imaging module includes a ray source device and a detector.

15. The vehicle-mounted type back scattering inspection system according to claim 1, further comprising a face recognition device and/or a millimeter wave imaging device arranged in the carriage.

* * * * *